United States Patent [19]

Kurdziel

[11] Patent Number: 5,768,365
[45] Date of Patent: Jun. 16, 1998

[54] CIRCUIT FOR SENSING TELEPHONE LINE CONDITIONS

[75] Inventor: Ryszard Kurdziel, Calgary, Canada

[73] Assignee: Northern Telecom Limited, Montreal, Canada

[21] Appl. No.: 355,952

[22] Filed: Dec. 14, 1994

[51] Int. Cl.⁶ .................. H04M 1/00; H04M 11/00
[52] U.S. Cl. .................. 379/377; 379/27; 379/30; 379/164; 379/382
[58] Field of Search .................. 329/377, 379, 329/381, 385, 164; 379/165, 156, 166, 161, 162, 163, 382, 27, 30

[56] References Cited

U.S. PATENT DOCUMENTS

| | | | |
|---|---|---|---|
| 4,220,825 | 9/1980 | Fahey | 379/380 |
| 4,958,371 | 9/1990 | Damoci et al. | 379/377 |
| 5,111,802 | 5/1992 | McClure et al. | 379/380 |
| 5,140,631 | 8/1992 | Stahl | 379/377 |
| 5,291,545 | 3/1994 | Stahl | 379/98 |
| 5,388,153 | 2/1995 | Burger et al. | 379/164 |
| 5,422,939 | 6/1995 | Kramer et al. | 379/107 |

Primary Examiner—Krista Zele
Assistant Examiner—Jacques Saint-Surin
Attorney, Agent, or Firm—Thomas R. Vigil

[57] ABSTRACT

A circuit for sensing telephone line conditions, comprising: high impedance termination means across the telephone line; means for accumulating charge through the high impedance termination means; and electrical isolator means intermediate the means for accumulating charge and voltage detecting means.

4 Claims, 1 Drawing Sheet

5,768,365

CIRCUIT FOR SENSING TELEPHONE LINE CONDITIONS

BACKGROUND OF THE INVENTION

1. Field of the Invention

The present invention relates to telephone sets in general, and in particular to a circuit in a telephone set for sensing the condition of a telephone line to indicate, for example, whether another telephone or other device on the line, or one of a number of lines, is off-hook. Other conditions of a line may also be sensed, such as "Message Waiting".

2. Description of the Related Art Including Information Disclosed Under 37 CFR §§ 1.97–1.99

U.S. Pat. No. 4,647,723 granted Mar. 3, 1987 to K. R. Voorhies discloses a solid state circuit designed to be incorporated into a telephone terminal instrument to provide a visual indication at that instrument that a telephone line to which the instrument is connected is already in use by another telephone instrument.

SUMMARY OF THE INVENTION

According to the present invention there is provided a line condition sensing circuit suitable for microcomputer controlled telephone sets and the like.

The circuit of the present invention provides electrical isolation between the telephone set it is incorporated in and the telephone line it is monitoring; this provides electrical isolation between different lines connected to the same telephone set.

In addition to sensing that another telephone set or device is using the line it is connected to, the circuit may also be used to trip an answering machine, to log calls as answered in a call display telephone, to automatically drop a held call, to indicate disconnection of the telephone cord, or to indicate a "message waiting" signal on the monitored line.

Accordingly, the present invention provides a circuit for sensing telephone line conditions, comprising: high impedance termination means across the telephone line; means for accumulating charge through said high impedance termination means; and electrical isolator means intermediate said means for accumulating charge and voltage detecting means.

BRIEF DESCRIPTION OF THE DRAWINGS

The preferred embodiment of the present invention will now be described in conjunction with the annexed drawing FIGURE, which is a circuit and block, schematic for use in a multi-line telephone set.

DESCRIPTION OF THE PREFERRED EMBODIMENT(S)

Figure 1:
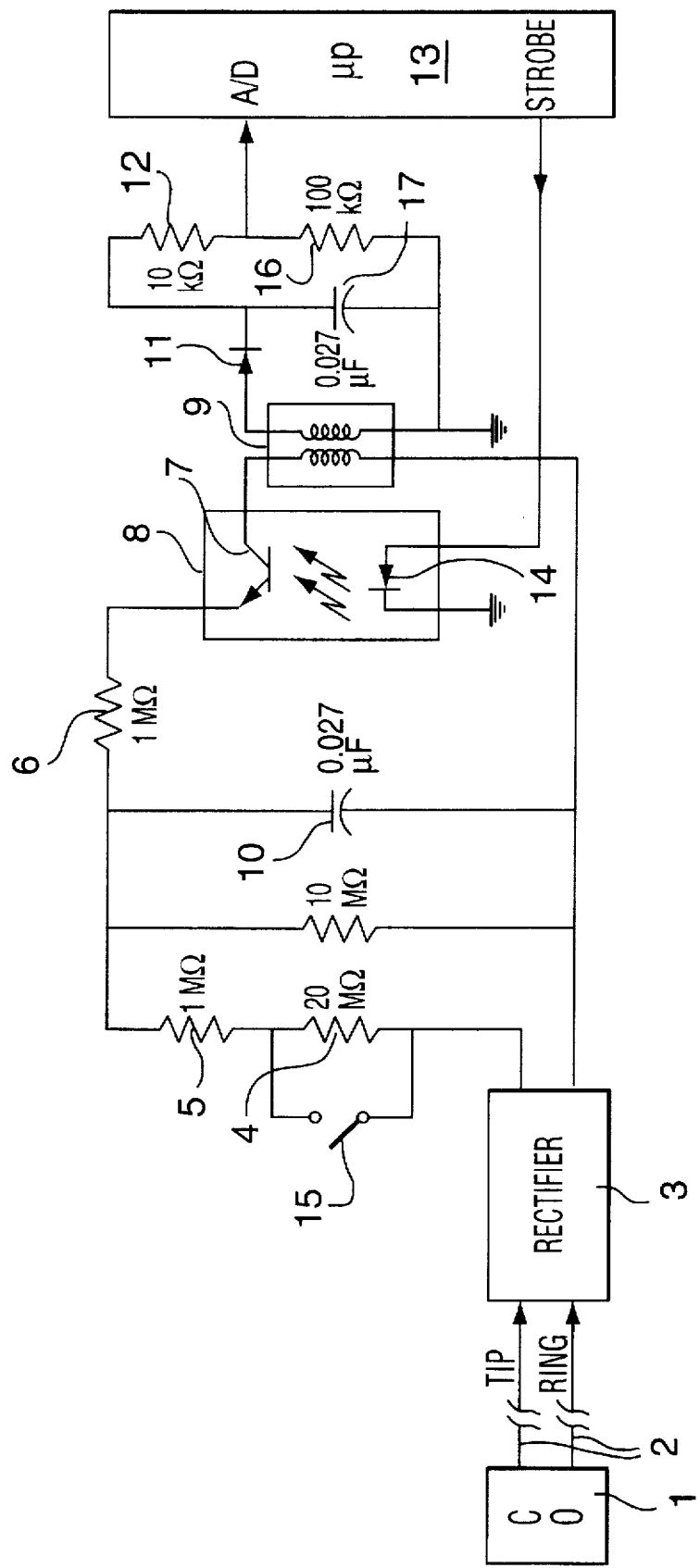

Referring now to the drawing FIGURE, a central office (CO) 1 is connected via telephone line 2 to voltage rectifier 3, the output of which is connected through high impedance resistor 4, resistor 5 and resistor 6 to phototransistor 7 in optical coupler 8 (also known as optical insulator), the other terminal of which is connected to one end of the primary winding of electrical isolator (a pulse transformer) 9, the other end of the primary winding completing the circuit by being connected to the remaining terminal of the rectifier 3, to which is also connected one terminal of charge accumulating capacitor 10, the other terminal of which is connected to the phototransistor end of the resistor 5. This is the "CO side" of the circuit of the present invention, which CO side is electrically isolated from the telephone set side by means of the electrical isolating pulse transformer 9.

The secondary winding of the transformer 9, is connected via rectifier diode 11 and resistor 12 to the A/D (analog-to-digital) input of a micro-computer 13 in the telephone set. A capacitor 14 is connected between the cathode of the diode 11 and the other terminal of the secondary winding of the transformer 9. The micro-computer 13 "strobes" light emitting diode 14 in the optical computer S when required, thereby discharging the capacitor 10 via the resistor 6 through the primary winding of the transformer 9. This side of the circuit shown is the "local side".

In operation, when hook-switch contact 15 (across the resistor 4) is open (that is in the off-hook condition), the diode 11 ensures that the voltage at the A/D input of the microprocessor 13 is always above ground reference. Resistor 12 and 16 bleed capacitor 17, so that its voltage follows the voltage across the telephone line 2. Since the line 2 "sees" a very high impedance of approximately 21M ohm across, it is unaffected, and several such impedances may be across the same line in parallel without violating the on-hook impedance specifications of the telephone company.

Also, in this condition the high voltage dividing ratio permits voltage sensing up to 120 volts. (Thus enabling the microprocessor 13 to recognize a "message waiting" voltage on the telephone line 2).

In an off-hook condition of the telephone set the switch 15 is closed. The impedance then seen by the line 2 is approximately 1M ohm. Voltages up to approximately 12 V can be measured, the lower ratio of the voltage divider yields better resolution for the low voltages present while off-hook.

Timing control of the circuit is provided by the microprocessor 13. The microprocessor 13, having an analog to digital convertor, uses it to measure the voltage developed on the local capacitor 17. The microprocessor 13 uses the voltage measurements to indicate that the extension is in use, and so forth.

the microprocessor 13 uses a slower strobe or sample rate for on-hook conditions than it does for off-hook conditions. 15 This is done in order to minimize the risk of violating the on-hook impedance specifications. The on-hook sample period is 160 ms. The off-hook sample rate is 16 ms.

The microprocessor 13 operates (strobes) the LED 14 whenever a sample is required, the optically coupled transistor 7 switches the charge from the capacitor 10 through the pulse transformer 9 to the capacitor 17. The microprocessor 13 then measures the voltage on the capacitor 17 within a certain time limit to guarantee a certain precision of measurement as required.

From the foregoing description, it will be apparent that the circuit for sensing telephone line conditions of the present invention has a number of advantages, some of which have been described above and others of which are inherent in the invention. Also it will be understood that modifications can be made to the circuit for sensing telephone line conditions described above without departing from the teachings of the present invention. Accordingly, the scope of the invention is only to be limited as necessitated by the accompanying claims.

I claim:

1. A circuit for sensing telephone line conditions, comprising: high impedance termination means across the telephone line; means for accumulating charge through said high impedance termination means; electrical isolator means intermediate said means for accumulating charge and voltage detecting means; said means for accumulating charge is strobed periodically by means of optical coupler to transfer its charge to said electrical isolator means; and said means for accumulating charge is a capacitor connected in series with a variable resistance when said telephone line is not terminated by an off-hook condition, and said capacitor is connected in parallel with a high resistance of several million ohms.

2. A circuit for sensing telephone line conditions, comprising: high impedance termination means across the telephone line; means for accumulating charge through said high impedance termination means; electrical isolator means intermediate said means for accumulating charge and voltage detecting means; and electrical isolator means is a transformer; and said transformer has a diode connected in series with its secondary winding for charging a capacitor in proportion to accumulated charge on said means for accumulating charge when the later is strobed to discharge it through a primary winding of said transformer.

3. The circuit as defined in claim 2 wherein said capacitor has its state of charge periodically sensed by an analog-digital convertor.

4. The circuit as defined in claim 3 wherein said means for accumulating charge is another capacitor on one side of a rectifier, the other side of which is connected to the telephone line.

* * * * *